United States Patent [19]

Sant'Agostino

[11] 4,034,340
[45] July 5, 1977

[54] SYSTEM FOR DETERMINING THE QUALITY OF TRANSMISSION OF INCOMING DIGITAL MESSAGE SIGNALS

[75] Inventor: Marcello Sant'Agostino, Gattinara (VC), Italy

[73] Assignee: CSELT - Centro Studi e Laboratori Telecomunicazioni SpA, Turin, Italy

[22] Filed: June 8, 1976

[21] Appl. No.: 693,869

[30] Foreign Application Priority Data

June 10, 1975  Italy .................. 68487/75

[52] U.S. Cl. ................... 340/146.1 R; 307/358; 325/323; 328/115; 340/146.1 A X; 340/172
[51] Int. Cl.² .................. H03K 13/32
[58] Field of Search ......... 340/146.1 AX, 146.1 R, 340/169, 172; 307/235 A, 235 J, 235 K; 328/115, 116; 329/109; 325/323, 326

[56] References Cited

UNITED STATES PATENTS

| 3,509,279 | 4/1970 | Martin et al. | 325/326 |
| 3,638,183 | 1/1972 | Progler et al. | 340/146.1 A X |
| 3,670,304 | 6/1972 | Andresen et al. | 328/115 |
| 3,777,268 | 12/1973 | Cleobury et al. | 328/115 |
| 3,882,458 | 5/1975 | Hoeschele, Jr. | 340/146.1 R |
| 3,936,740 | 2/1976 | Hogg et al. | 328/115 |
| 3,999,083 | 12/1976 | Bumgardner | 307/235 K |

Primary Examiner—Charles E. Atkinson
Attorney, Agent, or Firm—Karl F. Ross; Herbert Dubno

[57] ABSTRACT

At a receiver for binary or other digital message signals, the incoming signals are fed in parallel to a first decision network with a relatively low threshold and a second decision network with a relatively high threshold, the latter being adjustable. The output of the first decision network is delivered to a utilization circuit and in parallel therewith, together with the output of the second decision network, to a comparator emitting a pseudo-error pulse in response to any divergence in the two outputs. A counter stepped by the pseudo-error pulses, upon reaching a predetermined count, triggers a pulse generator producing a binary voltage $v_i$ whose mean value $v_u$, obtained by integration, is a measure of signal degradation. Under the control of this mean value $v_u$ the threshold of the second decision network is automatically varied in the opposite sense to maintain a substantially constant pseudo-error rate. Another comparator, on detecting a lowering of this threshold beyond a permissible minimum, triggers an alarm circuit to bring about a manual or automatic switchover to another transmission channel. The voltage $v_u$ or its reciprocal, the variable threshold, may be continuously monitored by visual inspection and/or automatic recording.

8 Claims, 5 Drawing Figures

SYSTEM FOR DETERMINING THE QUALITY OF TRANSMISSION OF INCOMING DIGITAL MESSAGE SIGNALS

FIELD OF THE INVENTION

My present invention relates to a system for determining the degradation or distortion of binary or other digital message signals arriving over a transmission channel such as, for example, a radio link.

BACKGROUND OF THE INVENTION

A well-known method of determining the distortion of binary signals is through the use of a so-called eye pattern, e.g. as described in the book *Data Transmission* by Davey Bennett, McGray-Hill Book Co., 1965, pp. 118-121, Chapter 7—7. By this method, visual observation of an oblong trace on an oscilloscope screen gives an estimate of the distortion introduced along the transmission channel, the ratio of the internal to the external height of the pattern being a measure of signal quality. Other conventional techniques include the use of the so-called PAR meter described in an article by John H. Fennick, IEEE Transactions on Communication Technology, Vol. Com-18, No. 1, February 1970; that system requires the transmission of a special test pulse. Other prior-art systems rely on certain predetermined characteristics of a transmitted pulse sequence, such as the presence of parity bits and other redundancies. Reference in this connection may be made to CCIR Report 613, entitled "Bit Error Performance Measurements for Digital Radio Relay Systems", CCIR Vol. 9 (UIT), Geneva 1975.

Though the last-mentioned type of system enables the continuous surveillance of a transmission path by automatic means, it requires costly multiplexing and demultiplexing equipment for the insertion and recovery of the redundancy bits. Moreover, the detection of a statistically sufficient number of transmission errors in such a system generally requires considerable time, especially if a high degree of sensitivity is desired, so that corrective adjustments may not keep pace with changes in the transmission-channel characteristics. Finally, modern radio links used for the transmission of binary signals generally perform satisfactorily for extended periods and are only intermittently subject to substantial distortion. The error rate, however, varies by several orders of magnitude in response to changes in the signal-to-noise ratio by only a few decibels. Thus, the average error rate is not a dependable indicator of the sharp signal degradations occurring during less than 10% of total transmission time.

In an article by D.J. Gooding entitled "Performance Monitor Techniques for Digital Receivers, based on the Extrapolation of Error Rate", published in IEEE Transactions Com-16, pp. 380-387, June 1968, there is described a method of determining the transmission-error rate by feeding the incoming binary signals, demodulated from their carrier, to a set of ancillary decision networks in parallel with a main decision network delivering these signals to a load. These ancillary networks have different thresholds for the evaluation of signal amplitudes, the absolute values of the thresholds of the ancillary networks exceeding that of the threshold of the main decision network whereby one or more of these ancillary networks will register deviations from the output of the main network, according to the degree of degradation. These deviations, termed "pseudo-errors", occur more frequently than actual errors (i.e. inconsistencies between the transmitted signal and the signal reconstituted by the main decision network) and can therefore be counted more rapidly to provide an evaluation of the channel characteristics in a shorter time. An estimate of the actual transmission-error rate is obtainable from an extrapolation of the readings of the several pseudo-error counters.

OBJECT OF THE INVENTION

The object of my present invention is to provide a system which, by improving on the aforedescribed technique of pseudo-error determination, allows a continuous monitoring of transmission quality with the aid of relatively simple and inexpensive electronic equipment.

SUMMARY OF THE INVENTION

In accordance with my present invention, an ancillary decision network of the aforementioned type has a threshold which is variable within a predetermined range of signal levels, the outputs of this ancillary decision network and the associated main decision network being connected to a comparison circuit which emits a pseudo-error pulse in response to a discrepancy between these outputs. The comparison circuit feeds an evaluation unit which produces a control voltage, representative of the average rate of pseudo-error pulses emanating from that circuit, to adjust the variable threshold of the ancillary decision network in inverse relationship with the average pseudo-error rate in order to maintain that rate substantially constant. Significant changes in the control voltage are ascertained with the aid of monitoring means which may comprise a visual indicator, an automatic recorder, and/or an alarm circuit designed to generate a malfunction signal whenever that voltage attains a predetermined limiting value.

According to a more particular feature of my invention, the evaluation unit comprises a pulse counter which triggers a waveform generator to produce a rectangular voltage pulse whenever the count of pseudo-error pulses reaches a predetermined magnitude. The control voltage is derived from the output of the waveform generator by integration of the rectangular pulses in a low-pass filter. The variable threshold of the ancillary decision network may be derived from this control voltage by simple inversion.

A single ancillary decision network of variable threshold voltage may be used with both unipolar and bipolar signaling. In the case of multilevel signals a corresponding number of such networks may be provided.

SPECIFIC DESCRIPTION

Figure 1:
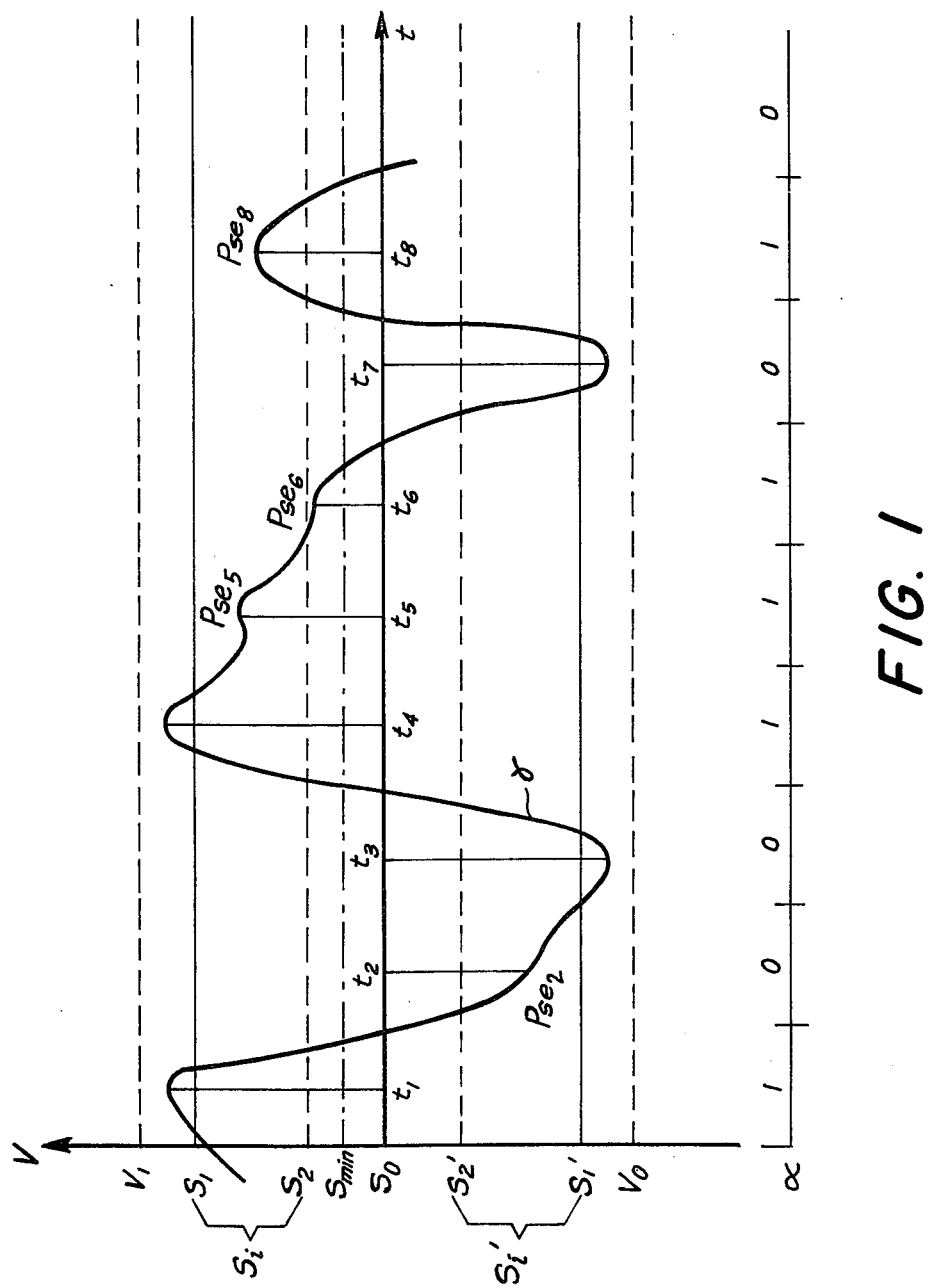
FIG. 1 is a graph serving to explain the principles underlying my invention.

In FIG. 1 I have shown an incoming signal voltage $\gamma$ representative of a binary message $\alpha$ received from a remote transmitting station via a radio link or other channel. The original message $\alpha$ is shown, by way of example, to consist of a sequence of bits 1-0-0-1-1-1-0-1 . . . occupying respective time slots centered on instants $t_1–t_8$, these instants being the times when the wave $\gamma$ is sampled. In the absence of distortion, the incoming signal $\gamma$ would be a square wave varying between a lower range limit $V_0$ and an upper range limit $V_1$; the median level of this signal range has been designated $S_0$. Between voltage levels $S_0$ and $V_1$, i.e. in the voltage band assigned to signals of nominal value 1, I have indicated two possible levels $S_1$ and $S_2$ of a variable threshold voltage $S_i$; a corresponding variable threshold voltage $S_i'$ for signals of nominal value 0 may assume levels $S_1'$ and $S_2'$ between voltages $V_0$ and $S_0$. The absolute values of voltage differences $S_1 - S_0$ and $S_1' - S_0$ exceed those of voltage differences $S_2 - S_0$ and $S_2' - S_0$.

Let us consider a main decision network discriminating between signal voltages above and below threshold $S_0$, associated with two ancillary decision networks with variable thresholds $S_i$ and $S_i'$, respectively. As shown, the received signal $\gamma$ rises above threshold $S_0$ at the instants of sampling whenever the original signal $\alpha$ has the binary value 1 and drops below that threshold at all sampling instants when this binary value is 0. Thus, the output voltage of the main decision network faithfully replicates the transmitted signal $\alpha$.

On the other hand, signal $\gamma$ falls short of the higher threshold level $S_1$ at times $t_5$, $t_6$ and $t_8$ when $\alpha = 1$; it also remains above threshold level $S_1'$ at time $t_2$ when $\alpha = 0$. At time $t_6$, moreover, it also fails to reach the lower threshold level $S_2$. Thus, the graph of FIG. 1 indicates several pseudo-errors $Pse_5$, $Pse_6$, $Pse_8$ which would show up in the output of a decision network with threshold $S_1$ whereas only one such pseudo-error, $Pse_6$, would occur if that threshold were lowered to level $S_2$. Similarly, a shift from threshold $S_1'$ to threshold $S_2'$ would also remove the pseudo-error $Pse_2$. Thus, the number of pseudo-errors decreases as the ancillary thresholds $S_i$ and $S_i'$ approach the main threshold $S_0$.

In most conventional modulation systems (contrary to what has been shown in FIG. 1), e.g. with coherent demodulation of phase-modulated carriers or with discriminator demodulation of frequency-modulated carriers, the demodulated signal wave $\gamma$ will be substantially balanced about line $S_0$ so that a count of the pseudo-errors above or below that line will serve to provide the desired measure of signal degradation. In multilevel signal systems, where statistically similar degrees of degradation prevail at the various signal levels, a single ancillary decision network will also suffice.

If transmission quality is poor but still acceptable, even a relatively low ancillary threshold $S_i = S_2$ will supply a statistically significant number of pseudo-errors in a relatively short time. As quality improves, however, the pseudo-error rate will sharply decrease unless the threshold $S_i$ is correspondingly raised to, say, level $S_1$. It is for this reason that, in accordance with the present invention, I provide for a shifting of the ancillary threshold $S_i$ (or $S_i'$) in a sense tending to keep the average pseudo-error rate substantially constant as long as transmission quality remains above a limit of acceptability. That limit is reached when the variable ancillary threshold $S_i$ approaches so close to the fixed threshold $S_0$ that a significant number of voltage samples corresponding to a transmitted pulse of value 1, failing to surpass the threshold $S_i$, also falls short of the threshold $S_0$. It is therefore possible to set a statistically determinable minimum level $S_{min}$ below which the absolute value of the variable threshold should not drop during normal operation; if it does, an alarm indication should be given to alert an operator and/or to actuate automatic equipment for switching to a different channel as is well known per se.

Figure 2:
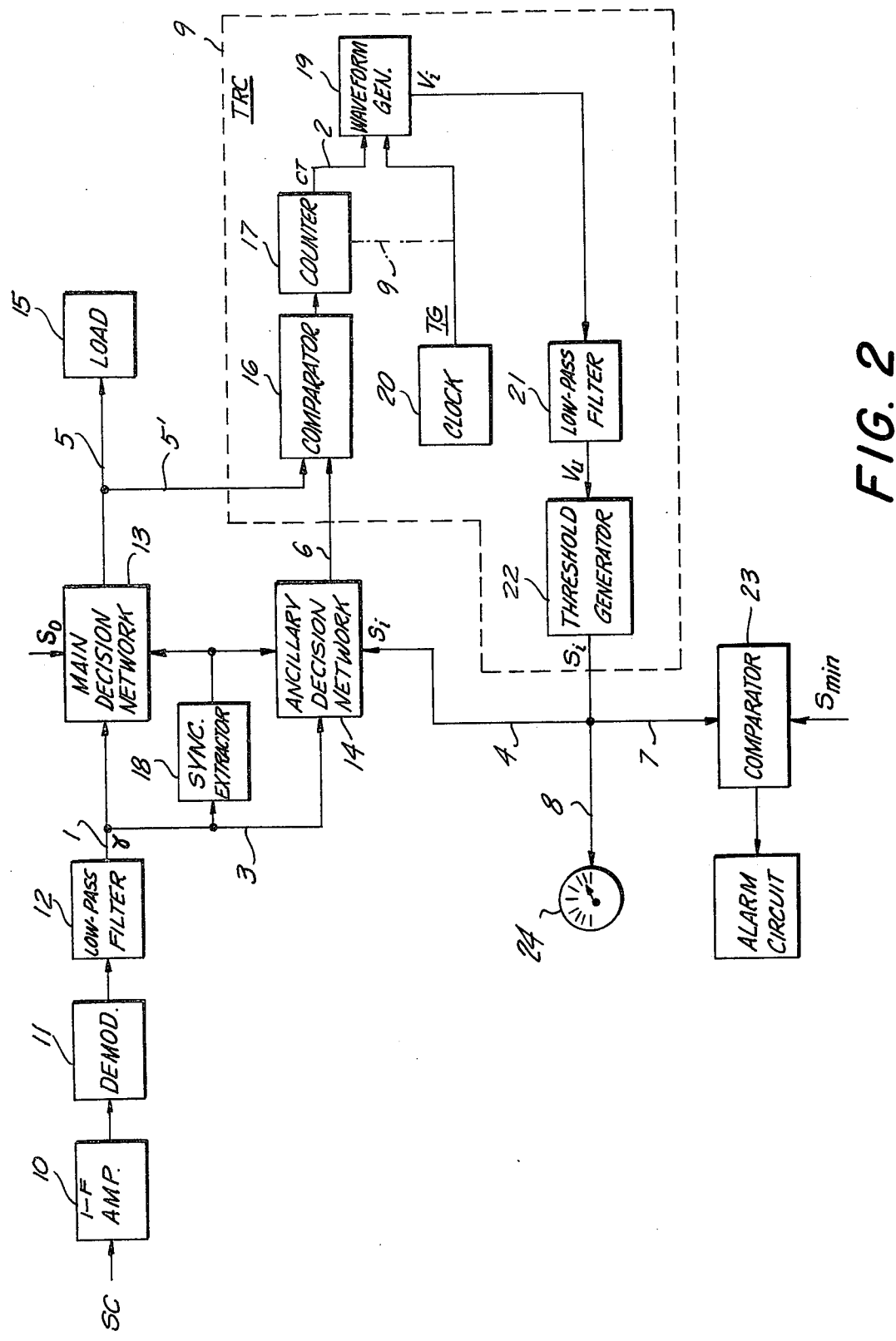
FIG. 2 is a block diagram of a degradation-determining system representing a preferred embodiment.

In FIG. 2 I have shown an intermediate-frequency amplifier 10 receiving an incoming subcarrier SC which is fed to a demodulator 11 followed by a low-pass filter 12 to recover the message signal $\gamma$, discussed above in connection with FIG. 1, on a lead 1 extending to a main decision network 13 and in parallel therewith, via a branch lead 3, to an ancillary decision network 14. Network 13 receives a fixed reference voltage, corresponding to its threshold $S_0$, on the basis of which it does or does not energize an output lead 5 extending to a utilization circuit or load 15. A branch 5' of lead 5 and an output lead 6 of network 14 terminate at respective inputs of a comparator 16 working into a pulse counter 17. A sync-signal extractor 18 determines, in a conventional manner, the midpoints $t_1–t_8$ (FIG. 1) of the pulse periods or time slots during which the networks 13 and 14 are to be sampled.

Figures 3, 4, 5:
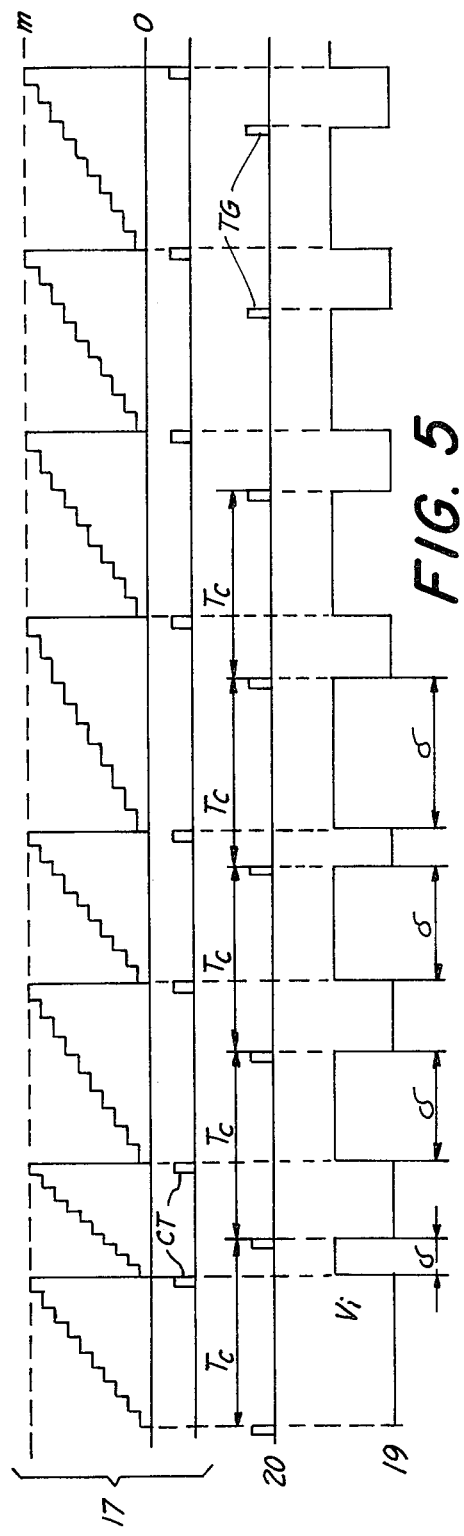
FIGS. 3-5 are graphs relating to the operation of the system of FIG. 2.

Counter 17 has an output lead 2 extending to a waveform generator 19 also receiving periodic timing pulses TG from a local clock circuit 20. Waveform generator 19 produces a sequence of rectangular pulses $V_i$ which are integrated in a low-pass filter 21 to yield a control voltage $V_u$ fed to a threshold generator 22. Voltage $V_u$, shown in FIG. 3, is inverted in generator 22 to provide a voltage $S_i$, FIG. 4, on an output lead 4 of this generator extending to decision network 14. Voltage $S_i$ represents the variable threshold for this decision network and is also supplied via branch leads 7 and 8 to another comparator 23 and to a monitoring instrument 24. Comparator 23 receives a fixed reference voltage, constituting the aforementioned minimum level $S_{min}$, and trips an alarm circuit 25 whenever the threshold voltage $S_i$ drops to that level $S_{min}$.

Instrument 24 may be a simple visual indicator such as a voltmeter, as shown, but could also include automatic means for registering the instantaneous value of threshold voltage $S_i$ or its reciprocal, i.e. control voltage $V_u$, on a tape or other suitable recording medium.

Elements 16–22 form part of an evaluation unit, generally designated TRC, which derives the two related voltages $V_u$ and $S_i$ from the average rate of pseudo-errors occurring in the output 6 of ancillary decision network 14. Counter 17 may operate in the manner illustrated in the correspondingly designated graph of FIG. 5, returning automatically to zero upon reaching a predetermined count $m$ and emitting a pulse CT on lead 2 (FIG. 2) on every such resetting. This counter pulse CT triggers the waveform generator 19 into producing a rectangular pulse $V_i$ which terminates upon the occurrence of a timing pulse TG from clock 20. The period $T_C$ of pulses TG is constant but the duration $\delta$ of pulses $V_i$ varies—in steady-state operation—inversely with the time required by the counter 17 to reach its maximum count $m$. Thus, if the rate of pseudo-errors in the output of comparator 16 is high, the immediately following pulses $V_i$ are relatively wide as shown in FIG. 5; if that rate decreases, by virtue of an improvement in the transmission quality, the pulses $V_i$ become narrower and result in a correspondingly reduced control voltage $V_u$ (FIGS. 2 and 3) in the output of integrator 21. It will therefore be apparent that the reciprocal of this control voltage, when used as the variable threshold voltage $S_i$ of decision network 14, will tend to maintain the pseudo-error rate substantially constant and at such a value that the counter 17 reaches its limit $m$ during an interval shorter than the timing-pulse period $T_C$. Since the threshold voltage $S_i$ varies inversely with the degree of signal degradation, that voltage as read on meter 24 can also be used as an indicator of transmission quality similar to but more precise than the visually ascertainable height ratio or opening of the conventional eye pattern. The numerical value of this reading can also be conveniently registered on a recording medium. Short-term disturbances due to sharp noises or signal interference, which are not readily observable on an oscilloscope screen, are taken into account by the evaluation unit TRC.

Voltage levels $S_i$ not low enough to actuate the alarm circuit 25 but still close to the limit of acceptability may give rise to an alert signal foreshadowing the possible need for a switchover to a move suitable transmission channel at the remote station.

If the counter 17 is not of the cyclic type with automatic zero return, it may remain at its maximum count $m$ until reset by a pulse TG from clock 20 via a connection represented by a dot-dash line 9. Alternatively, the waveform generator 19 may be a monoflop producing pulses $V_t$ of fixed duration $\delta$ on being tripped by a pulse CT from the self-resetting counter 17; in that case the clock 20 can be omitted. The operation of an evaluation unit TRC modified in either of these ways is analogous to that described with reference to FIG. 5.

I claim:

1. A system for determining, at a receiver for digital message signals, the quality of transmission of said signals, comprising:
    input means for obtaining incoming message signals from a transmission channel;
    a first and a second decision network connected in parallel to said input means, said first network having a fixed threshold of relatively low absolute value for discriminating between different signal levels in a predetermined range, said second network having a variable threshold of relatively high absolute value for discriminating between signal levels in the same range;
    a utilization circuit connected to the output of said first network;
    comparison means connected to the outputs of said first and second networks for emitting a pseudo-error pulse in response to any discrepancy between said outputs;
    evaluation means connected to said comparison means for producing a control voltage representative of the average rate of pseudo-error pulses emanating therefrom, said second network being connected to said evaluation means for adjusting said variable threshold thereof in response to said control voltage and in inverse relationship with said average rate to maintain the latter substantially constant; and
    monitoring means connected to said evaluation means for ascertaining significant changes in said control voltage.

2. A system as defined in claim 1 wherein said monitoring means comprises alarm means for generating a malfunction indication upon said control voltage attaining a predetermined limiting value.

3. A system as defined in claim 1 wherein said monitoring means comprises a continuously operative voltage indicator.

4. A system as defined in claim 1 wherein said evaluation means comprises a pulse counter, a waveform generator triggerable by said pulse counter to produce a rectangular voltage pulse upon attainment of a predetermined count of said pseudo-error pulses, and filter means for integrating the rectangular voltage pulses of said waveform generator to produce said control voltage.

5. A system as defined in claim 4, further comprising voltage-inversion means connected to said filter means for deriving said variable threshold from said control voltage.

6. A system as defined in claim 4, further comprising timing means connected to said waveform generator for periodically terminating said rectangular voltage pulses.

7. A system as defined in claim 6 wherein said pulse counter is of the cyclic type returning to a zero setting upon reaching said predetermined count.

8. A system as defined in claim 6 wherein said timing means is connected to said pulse counter for periodically resetting same.

* * * * *